(12) United States Patent
Kidambi et al.

(10) Patent No.: US 8,959,885 B2
(45) Date of Patent: Feb. 24, 2015

(54) HEAT RECOVERY FROM A GASIFICATION SYSTEM

(75) Inventors: Ganesh Prasadh Kidambi, Bangalore (IN); Atul Kumar Vij, Bangalore (IN); Priyanandini Balasubramanian, Bangalore (IN); Ronald Frederick Tyree, Richmond, TX (US)

(73) Assignee: General Electric Company, Schenectady, NY (US)

( * ) Notice: Subject to any disclaimer, the term of this patent is extended or adjusted under 35 U.S.C. 154(b) by 811 days.

(21) Appl. No.: 13/215,090

(22) Filed: Aug. 22, 2011

(65) Prior Publication Data

US 2013/0047574 A1 Feb. 28, 2013

(51) Int. Cl.
*F02C 6/18* (2006.01)
*C01B 17/04* (2006.01)
*F01K 23/10* (2006.01)
*F01K 25/10* (2006.01)
(Continued)

(52) U.S. Cl.
CPC ............ *C01B 17/0404* (2013.01); *F01K 23/10* (2013.01); *F01K 25/10* (2013.01); *F01K 23/068* (2013.01); *C10J 3/86* (2013.01); *C10K 1/003* (2013.01); *C01B 2203/0485* (2013.01); *C01B 2203/0883* (2013.01); *C01B 2203/0894* (2013.01); *C01B 2203/84* (2013.01); *Y02E 20/18* (2013.01); *Y02E 20/16* (2013.01); *C10J 2300/0959* (2013.01); *C10J 2300/0976* (2013.01); *C10J 2300/1653* (2013.01); *C10J 2300/1678* (2013.01); *C10J 2300/1884* (2013.01); *C10J 2300/1892* (2013.01)

USPC ............. 60/39.181; 60/39.182; 60/39.19; 60/39.5; 60/783; 60/801; 60/39.15

(58) Field of Classification Search
CPC ........... Y02E 20/16; Y02E 20/18; F02C 3/28; F02C 3/34; F02C 3/36; F02C 6/18; F01K 23/068; F01K 23/10; F01K 25/10
USPC ............. 60/39.181, 39.182, 39.19, 39.5, 783, 60/801, 39.15
See application file for complete search history.

(56) References Cited

U.S. PATENT DOCUMENTS 3,307,350 A  3/1967 Squires
4,142,108 A * 2/1979 Matthews ............ 290/1 R
(Continued)

FOREIGN PATENT DOCUMENTS

EP      2103568 A2   9/2009
WO  2009142608 A2  11/2009

OTHER PUBLICATIONS

EP Office Action dated Feb. 17, 2014 from corresponding EP Patent Application No. 12181095.6.
(Continued)

*Primary Examiner* — Phutthiwat Wongwian
*Assistant Examiner* — Steven Sutherland
(74) *Attorney, Agent, or Firm* — Fletcher Yoder P.C.

(57) ABSTRACT

A heat recovery system for use with a gasification system is provided. One system includes a gasification system and an organic Rankine cycle system coupled to the gasification system. The organic Rankine cycle system is configured to receive heated fluid from the gasification system and to deliver cooled fluid to the gasification system. The organic Rankine cycle system is configured to produce power by converting heat energy in the heated fluid.

26 Claims, 4 Drawing Sheets

(51) Int. Cl.
*F01K 23/06* (2006.01)
*C10J 3/86* (2006.01)
*C10K 1/00* (2006.01)

(56) References Cited

U.S. PATENT DOCUMENTS

| | | | |
|---|---|---|---|
| 5,421,157 A * | 6/1995 | Rosenblatt | 60/649 |
| 5,640,842 A | 6/1997 | Bronicki | |
| 5,664,414 A * | 9/1997 | Bronicki et al. | 60/39.182 |
| 5,804,060 A | 9/1998 | Benguigui et al. | |
| 6,032,467 A | 3/2000 | Oshita et al. | |
| 6,058,695 A | 5/2000 | Ranasinghe et al. | |
| 6,167,706 B1 * | 1/2001 | Bronicki et al. | 60/651 |
| 6,216,436 B1 | 4/2001 | Ranasinghe et al. | |
| 6,571,548 B1 * | 6/2003 | Bronicki et al. | 60/772 |
| 7,226,572 B1 | 6/2007 | Keller | |
| 2002/0178723 A1 | 12/2002 | Bronicki et al. | |
| 2008/0060357 A1 | 3/2008 | Zimron et al. | |

OTHER PUBLICATIONS

"Ullman's Encyciopedia of Industrial Chemistry", Apr. 6, 2011, Wiley-VCH Verlag, XP002686614, vol. 16, pp. 517-518.

Search Report and Written Opinion from corresponding European Application No. 12181095.6-1270, dated Nov. 23, 2012.

* cited by examiner

HEAT RECOVERY FROM A GASIFICATION SYSTEM

BACKGROUND OF THE INVENTION

The subject matter disclosed herein relates generally to gasification systems, and more particularly, to a system for recovering low, moderate, and/or other grades of heat from a gasification system.

Gasification systems generate syngas that can be used for power production (e.g., an integrated gasification combined cycle power plant, etc.), chemical synthesis (e.g., ethanol, methanol, ammonia, Substitute Natural Gas (SNG), Fischer-Tropsch (FT) liquids, etc.), or other purposes. For example, integrated gasification combined cycle (IGCC) power plants are capable of generating energy from various carbonaceous feedstocks, such as coal or natural gas, relatively cleanly and efficiently. Gasification systems may convert the carbonaceous feedstock, or another fuel, into a gaseous mixture of carbon monoxide (CO) and hydrogen ($H_2$), i.e., syngas, by reaction with oxygen and steam in a gasifier. However, the syngas produced by the gasification system often needs to be cooled, and in certain configurations cleaned, before it is used. During the cleaning and/or cooling process, some thermal energy may be unused, resulting in wasted energy. Likewise, the combustion of cleaned syngas may produce thermal energy that is unused. Therefore, a system that extracts thermal energy and thereby reduces the amount of wasted thermal energy may be desirable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a plurality of components having a gasifier configured to receive fuel and produce syngas and a gas cooling system coupled to the gasifier and configured to cool the syngas from the gasifier. The plurality of components also includes a gas cleaning system coupled to the gas cooling system and configured to clean the syngas from the gas cooling system and a gas turbine coupled to the gas cleaning system and configured to combust the syngas from the gas cleaning system. The system also includes an organic Rankine cycle system coupled to the plurality of components and configured to convert heat from the plurality of components to produce power.

In a second embodiment, a system includes an integrated gasification combined cycle (IGCC) system and an organic Rankine cycle system coupled to the IGCC system. The organic Rankine cycle system is configured to receive heated boiler feedwater from the IGCC system and to deliver cooled boiler feedwater to the IGCC system. The organic Rankine cycle system is configured to produce power by converting heat energy in the heated boiler feedwater to electrical energy.

In a third embodiment, an organic Rankine cycle system includes an evaporator configured to receive heated fluid from a gasification system and to deliver a cooled fluid to the gasification system. The organic Rankine cycle system also includes a turbo generator configured to receive refrigerant vapor from the evaporator. The turbo generator is driven by the refrigerant vapor to produce power. The organic Rankine cycle system includes a condenser configured to receive the refrigerant vapor from the turbo generator and to condense the refrigerant vapor to generate a liquid refrigerant. The organic Rankine cycle system also includes a pump configured to receive the liquid refrigerant from the condenser, to increase the pressure of the liquid refrigerant, and to deliver pressurized liquid refrigerant to the evaporator.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to utilizing heat generated from a gasification system for use in an organic Rankine cycle system. In certain embodiments, an integrated gasification combined cycle (IGCC) system utilizes heat exchangers to exchange heat between various heat sources and boiler feedwater, thereby producing heated boiler feedwater. For example, various heat sources in the IGCC system may include a low temperature gas cooling section, a sulfur recovery unit, and an extracted air cooling system. In some embodiments, hot raw syngas from a gasification system is used directly by the organic Rankine cycle system. The organic Rankine cycle system extracts heat from the heated fluid (e.g., heated boiler feedwater, hot raw syngas, and so forth) to generate power. Cooled fluid is returned to the gasification system.

Figure 1:
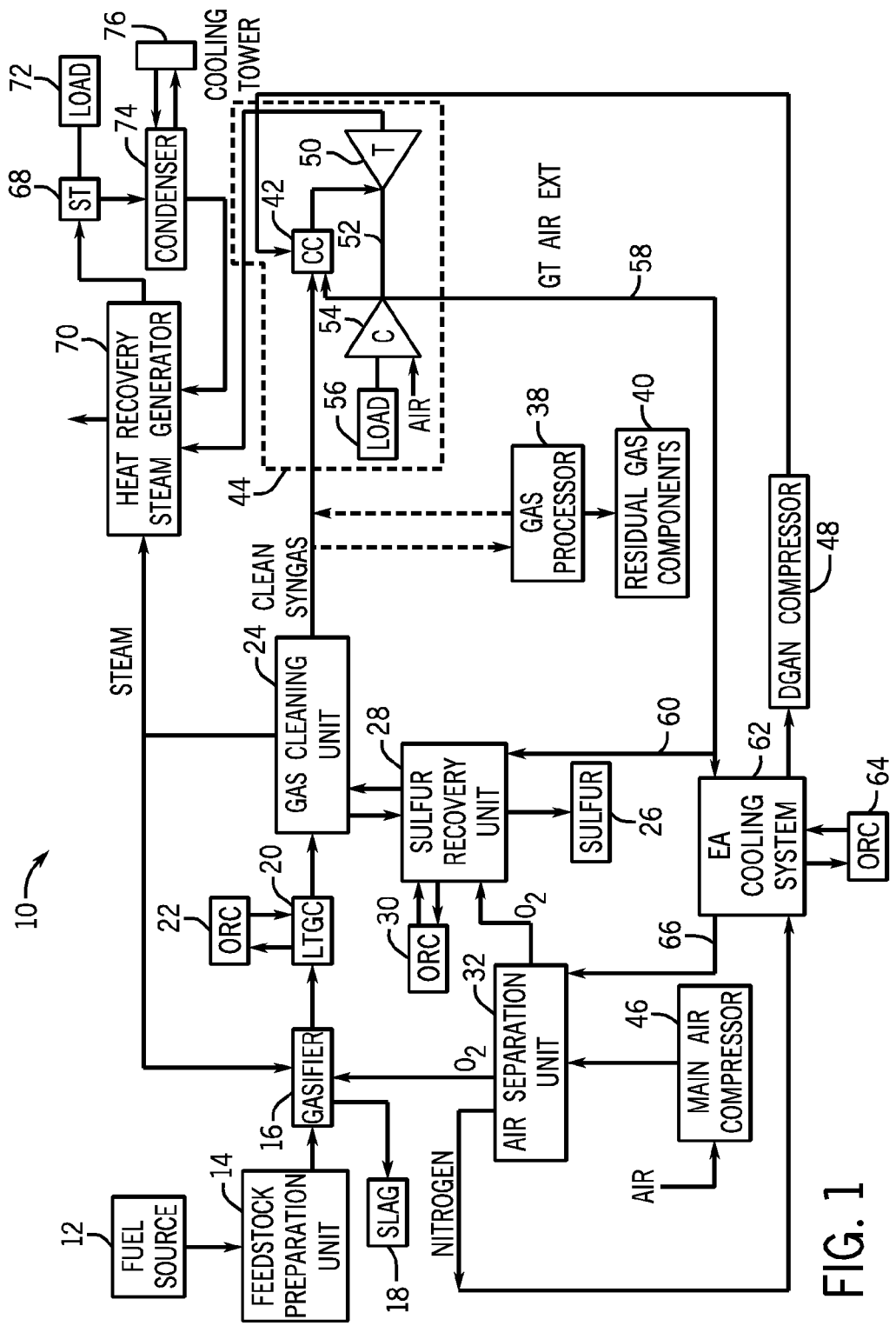
FIG. 1 is a block diagram of an embodiment of an integrated gasification combined cycle (IGCC) power plant in which organic Rankine cycles utilize heat generated by the system.

FIG. 1 is a schematic block diagram showing an embodiment of a power generation plant in which organic Rankine cycle systems utilize heat generated by the system. The illustrated power generation plant may be an IGCC system 10 that may produce and burn a synthetic gas, i.e., syngas. Elements of the IGCC system 10 may include a fuel source 12, such as a solid feed, that may be utilized as a source of energy for the IGCC system 10. The fuel source 12 may include coal, petroleum coke, biomass, wood-based materials, agricultural wastes, tars, coke oven gas, asphalt, heavy residues from a refinery, or other carbon containing items.

The solid fuel of the fuel source 12 may be passed to a feedstock preparation unit 14. The feedstock preparation unit 14 may, for example, resize or reshape the fuel source 12 by chopping, milling, grinding, shredding, pulverizing, briquetting, or palletizing the fuel source 12 to generate feedstock. Additionally, water, or other suitable liquids may be added to the fuel source 12 in the feedstock preparation unit 14 to create slurry feedstock. In other embodiments, no liquid is added to the fuel source, thus yielding dry feedstock.

The feedstock prepared by the feedstock preparation unit 14 may be passed to a gasifier 16. The gasifier 16 may convert the feedstock into syngas (e.g., a combination of carbon monoxide and hydrogen). This conversion may be accomplished by subjecting the feedstock to a controlled amount of any moderator (e.g., steam, liquid water, carbon dioxide, nitrogen, and so forth) and oxygen at elevated pressures (e.g., from absolute pressures of approximately 20 bar to approximately 85 bar) and temperatures (e.g., approximately 700° C. to approximately 1600° C.), depending on the type of gasifier 16 utilized. The heating of the feedstock during a pyrolysis process may generate a solid (e.g., char) and residue gases (e.g., carbon monoxide, hydrogen, and nitrogen). In certain embodiments, the char, or unconverted carbon, in the gasifier 16 may be separated from the produced gas and recycled back into the gasifier directly or indirectly.

The combustion reaction in the gasifier 16 may include introducing oxygen to the char and residue gases. The char and residue gases may react with the oxygen to form carbon dioxide ($CO_2$) and carbon monoxide (CO), which provides heat for the subsequent gasification reactions. The temperatures during the combustion process may range from approximately 700° C. to approximately 1600° C. In addition, steam may be introduced into the gasifier 16. The gasifier 16 utilizes steam and limited oxygen to allow some of the feedstock to be burned to produce carbon monoxide and energy, which may drive a second reaction that converts further feedstock to hydrogen and additional carbon dioxide.

In this way, a resultant gas may be manufactured by the gasifier 16. The resultant gas may include approximately 85 percent of carbon monoxide and hydrogen, as well as $CO_2$, $CH_4$, HCl, COS, $NH_3$, HCN, and $H_2S$ (based on the sulfur content of the feedstock). This resultant gas may be termed "raw syngas." The gasifier 16 may also generate waste, such as a slag 18, which may be a wet ash material.

The hot raw syngas from the gasifier 16 may then be directed into a low-temperature gas cooling (LTGC) unit 20, which may be configured to cool the hot raw syngas. As described below, in certain embodiments, the LTGC unit 20 may include one or more heat exchangers configured to transfer heat from the hot raw syngas into other media, such as boiler feedwater from a boiler feedwater system, steam condensate, and boiler feedwater from an organic Rankine cycle system 22. The organic Rankine cycle system 22 may use low grade heat from the LTGC unit 20 to operate a turbine generator as described below with respect to FIGS. 2 and 3.

The cooled raw syngas from the LTGC unit 20 may then be cleaned in a gas cleaning unit 24. The gas cleaning unit 24 may scrub the raw syngas to remove the HCl, HF, COS, HCN, and $H_2S$ from the raw syngas, which may include the separation of $H_2S$ by an acid gas removal process. Elemental sulfur 26 may by recovered from the $H_2S$ by a sulfur recovery unit (SRU) 28. As described below, in certain embodiments, the sulfur recovery unit 28 may include one or more heat exchangers configured to transfer heat to an organic Rankine cycle system 30. The organic Rankine cycle system 30 may use low grade heat from the sulfur recovery unit 28 to operate a turbine generator as described below with respect to FIGS. 2 and 4. The IGCC system 10 may include an air separation unit (ASU) 32 to separate air into component gases using, for example, cryogenic distillation techniques. The ASU 32 may supply oxygen to the sulfur recovery unit 28. In certain embodiments, the gas cleaning unit 24 primarily removes sulfur components from the raw syngas before it is sent to a gas turbine engine 44 as a clean syngas.

A gas processor 38 may be utilized to remove residual gas components 40 from the clean syngas, such as ammonia and methane, as well as methanol or other residual chemicals. However, removal of residual gas components 40 from the clean syngas is optional since the clean syngas may be utilized as a fuel even when containing the residual gas components 40 (e.g., tail gas). At this point, the clean syngas may include approximately 3 to 40 percent CO, up to approximately 60 percent $H_2$, and approximately 10 to 40 percent $CO_2$, and may be substantially stripped of $H_2S$. This clean syngas may be directed into a combustor 42 (e.g., a combustion chamber) of the gas turbine engine 44 as combustible fuel.

The ASU 32 may separate oxygen from the air supplied to it from a main air compressor (MAC) 46, and may transfer the separated oxygen to the gasifier 16 and to the SRU 28. Additionally, the ASU 32 may direct separated nitrogen to a diluent nitrogen (DGAN) compressor 48. The DGAN compressor 48 may compress the nitrogen received from the ASU 32 at least to pressure levels equal to those in the combustor 42, enabling injection into the combustor 42. Thus, once the DGAN compressor 48 has compressed the nitrogen to an adequate level, the DGAN compressor 48 may direct the compressed nitrogen to the combustor 42 of the gas turbine engine 44.

The illustrated gas turbine engine 44 includes a turbine 50, a drive shaft 52, and a compressor 54, as well as the combustor 42. The combustor 42 receives fuel, such as the syngas, which may be injected under pressure from fuel nozzles. This fuel may be mixed with compressed air as well as compressed nitrogen from the DGAN compressor 48, and combusted within the combustor 42. This combustion creates hot pressurized exhaust gases. The combustor 42 may direct the exhaust gases towards the turbine 50. As the exhaust gases from the combustor 42 pass through the turbine 50, the exhaust gases force turbine blades in the turbine 50 to rotate the drive shaft 52 along an axis of the gas turbine engine 44. As illustrated, the drive shaft 52 may be connected to various components of the gas turbine engine 44, including the compressor 54.

The drive shaft 52 may connect the turbine 50 to the compressor 54 to form a rotor. The compressor 54 may include blades coupled to the drive shaft 52. Thus, rotation of turbine blades in the turbine 50 may cause the drive shaft 52 connecting the turbine 50 to the compressor 54 to rotate blades within the compressor 54. The rotation of blades in the compressor 54 causes the compressor 54 to compress air received via an air intake in the compressor 54. The compressed air may then be fed to the combustor 42 and mixed with fuel and compressed nitrogen to allow for higher efficiency combustion. The drive shaft 52 may also be connected to a load 56, which may be a stationary load, such as an electrical generator, for producing electrical power in a power plant. Indeed, the load 56 may be any suitable device that is powered by the rotational output of the gas turbine engine 44.

In certain embodiments, the compressor 54 also provides a flow of air to the ASU 32 to supplement the MAC 46. Specifically, air may be extracted from the last stage of the compressor 54 and routed to the ASU 32 via an extraction air line or conduit 58. In certain configurations, approximately 5 to 50, 10 to 40, 10 to 35, or about 10 to 30 percent of the total air flow from the gas turbine compressor 54 may be extracted for use in the ASU 32. Furthermore, a portion of the air flow from the compressor 54 to the ASU 32 may be routed to the sulfur recovery unit 28 via a conduit 60. In certain embodiments, approximately 2 to 13, 3 to 12, 4 to 11, or about 5 to 10 percent of the air flow through the compressor-to-ASU conduit 58 may be routed through the conduit 60 to the sulfur recovery unit 28. In other embodiments, a separate conduit may route the air flow directly from the compressor 54 to the sulfur recovery unit 28.

An extracted air (EA) cooling system 62 may be coupled between the extraction air conduit 58 and the ASU 32 and between the ASU 32 and the DGAN compressor 48. The EA cooling system 62 may cool the extracted air before it is provided to the ASU 32. In addition, in certain embodiments, the EA cooling system 62 may be coupled to an organic Rankine cycle system 64 to transfer heat from the extracted air to create energy. The organic Rankine cycle system 64 may use low grade heat from the EA cooling system 62 to operate a turbine generator as described below with respect to FIGS. 2 and 5. The cooled extracted air from the EA cooling system 62 flows through a conduit 66 to the ASU 32.

The IGCC system 10 also may include a steam turbine engine 68 and a heat recovery steam generation (HRSG) system 70. The steam turbine engine 68 may drive a second load 72, such as an electrical generator for generating electrical power. However, both the first and second loads 56 and 72 may be other types of loads capable of being driven by the gas turbine engine 44 and the steam turbine engine 68, respectively. In addition, although the gas turbine engine 44 and the steam turbine engine 68 may drive separate loads 56 and 72, in certain embodiments, the gas turbine engine 44 and the steam turbine engine 68 may also be utilized in tandem to drive a single load via a single shaft. The specific configuration of the steam turbine engine 68, as well as the gas turbine engine 44, may be implementation-specific and may include any combination of sections.

Heated exhaust gas from the gas turbine engine 44 may be directed into the HRSG 70 and used to heat water and produce steam used to power the steam turbine engine 70. Exhaust from the steam turbine engine 68 may be directed into a condenser 74. The condenser 74 may utilize a cooling tower 76 to completely condense steam from the steam turbine discharge. In particular, the cooling tower 76 may provide cool water to the condenser 74 to aid in condensing the steam directed into the condenser 74 from the steam turbine engine 68. Condensate from the condenser 74 may, in turn, be directed into the HRSG 70. Again, exhaust from the gas turbine engine 44 may also be directed into the HRSG 70 to heat the water from the condenser 74 and produce steam. As such, in combined cycle systems such as the IGCC system 10, hot exhaust may flow from the gas turbine engine 44 to the HRSG 70, where it may be used to generate high-pressure, high-temperature steam. The steam produced by the HRSG 70 may then be passed through the steam turbine engine 68 for power generation.

Figure 2:
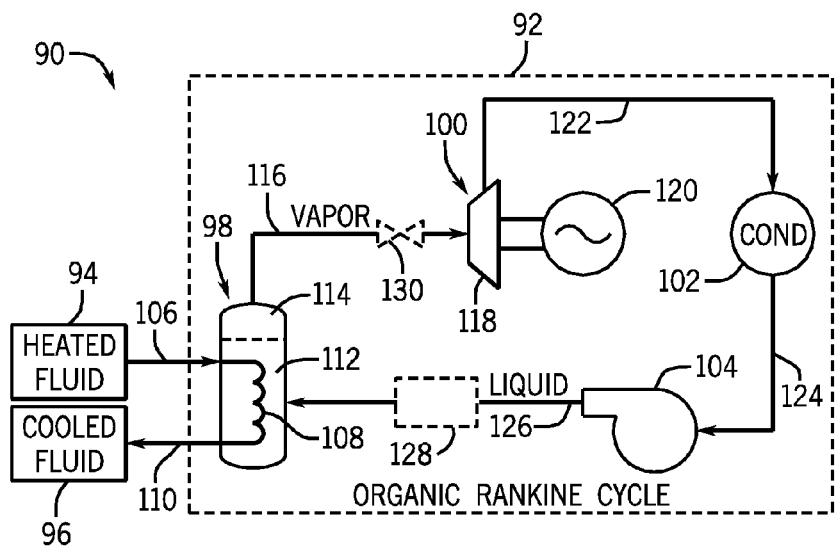
FIG. 2 is a process flow diagram of an embodiment of an organic Rankine cycle (ORC) system that may be used with a gasification system, such as the IGCC system of FIG. 1.

FIG. 2 is a process flow diagram of an embodiment of an organic Rankine cycle (ORC) system 90 that may be used with any gasification system, such as the IGCC system 10 of FIG. 1. The ORC system 90 includes an organic Rankine cycle (ORC) 92 that transfers heat from a heated fluid 94 (e.g., heated boiler feedwater, hot raw syngas, etc.) and returns a cooled fluid 96 (e.g., cooled boiler feedwater, cooled raw syngas, etc.). As illustrated, the ORC 92 includes an evaporator 98, a turbo generator 100, a condenser 102, and a pump 104. The heated fluid 94 flows through the evaporator 98 by entering through an inlet tube 106, flowing through a heat exchanger 108, and exiting through an outlet tube 110. In the evaporator 98, heat is transferred from the heated fluid 94 to a liquid refrigerant 112 in the evaporator 98. Thus, cooled fluid 96 exits the evaporator 98 through the tube 110. The heated fluid 94 may be approximately 70° C. to 175° C., 100° C. to 150° C., or 125° C. to 300° C. when it flows into the evaporator 98, while the cooled fluid 96 may be approximately 50° C. to 100° C., 65° C. to 85° C., or 70° C. to 75° C. when it flows out of the evaporator 98.

The liquid refrigerant 112 may be any suitable refrigerant, such as R-134, pentane, ammonia, i-pentane, butane, or isobutane, among others. For example, in certain embodiments, isobutene may be used because it remains dry through an expansion process, thereby limiting wear on the expander. Furthermore, isobutene is non-corrosive and may function as its own lubricant. The liquid refrigerant 112 vaporizes as it flows across the heated fluid 94 in the heat exchanger 108. For example, the liquid refrigerant 112 may vaporize at approximately 70° C. to 85° C. In certain embodiments, the liquid refrigerant 112 may be heated to approximately 100° C. to 300° C. The evaporator 98 enables the refrigerant vapor to separate from the liquid refrigerant 112 into a vapor section 114 near the top of the evaporator 98. From the evaporator 98, the refrigerant vapor flows through a tube 116 to the turbo generator 100. When the refrigerant vapor enters the turbo generator 100, the refrigerant vapor may be pressurized at approximately 10 bar. In certain embodiments, the refrigerant vapor pressure may be within a pressure range of approximately 7 bar to 120 bar. In certain embodiments, the turbo generator 100 includes a turbine 118 and an electrical generator 120. The turbine 118 is driven by the refrigerant vapor, and the turbine 118 in turn drives the generator 120 to produce electrical power.

In addition, a portion of the refrigerant vapor flows from the turbo generator 100 through a tube 122 to the condenser 102. The condenser 102 causes the refrigerant vapor to be condensed using a cooling medium, so that the refrigerant vapor changes to a generally liquid refrigerant 112, which exits the condenser 102. When the liquid refrigerant 112 exits the condenser 102, the liquid refrigerant 112 may be pressurized at approximately 0.1 bar. In certain embodiments, the liquid refrigerant 112 pressure may exit the condenser 102 in a pressure range of approximately 0.07 bar to 17.0 bar. The liquid refrigerant 112 from the condenser 102 flows through a hose or conduit 124 to the pump 104. The pump 104 pumps the liquid refrigerant 112 through the ORC 92, thereby increasing the pressure of the liquid refrigerant 112. The liquid refrigerant 112 from the pump 104 flows through a hose or conduit 126 and returns to the evaporator 98 where the cycle is repeated. In certain embodiments, a recuperator 128 is used to heat the liquid refrigerant 112 before it flows to the evaporator 98. The recuperator 128 may use heat from any available source to heat the liquid refrigerant 112. For example, the recuperator 128 may use heat from the gasification system, or some other system, to heat the liquid refrigerant 112. Furthermore, in certain embodiments, an expander 130 may be used between the evaporator 98 and the turbo generator 100. The expander 130 expands the refrigerant vapor from the evaporator 98 to decrease the vapor pressure.

Figure 3:
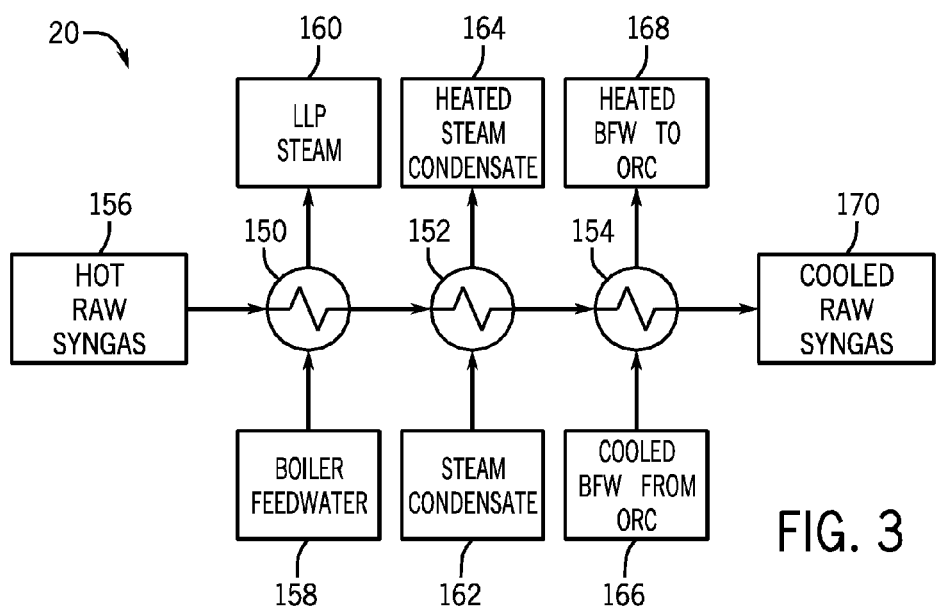
FIG. 3 is a process flow diagram of an embodiment of a low-temperature gas cooling (LTGC) unit of FIG. 1, which may be used with an organic Rankine cycle system.
Figure 4:
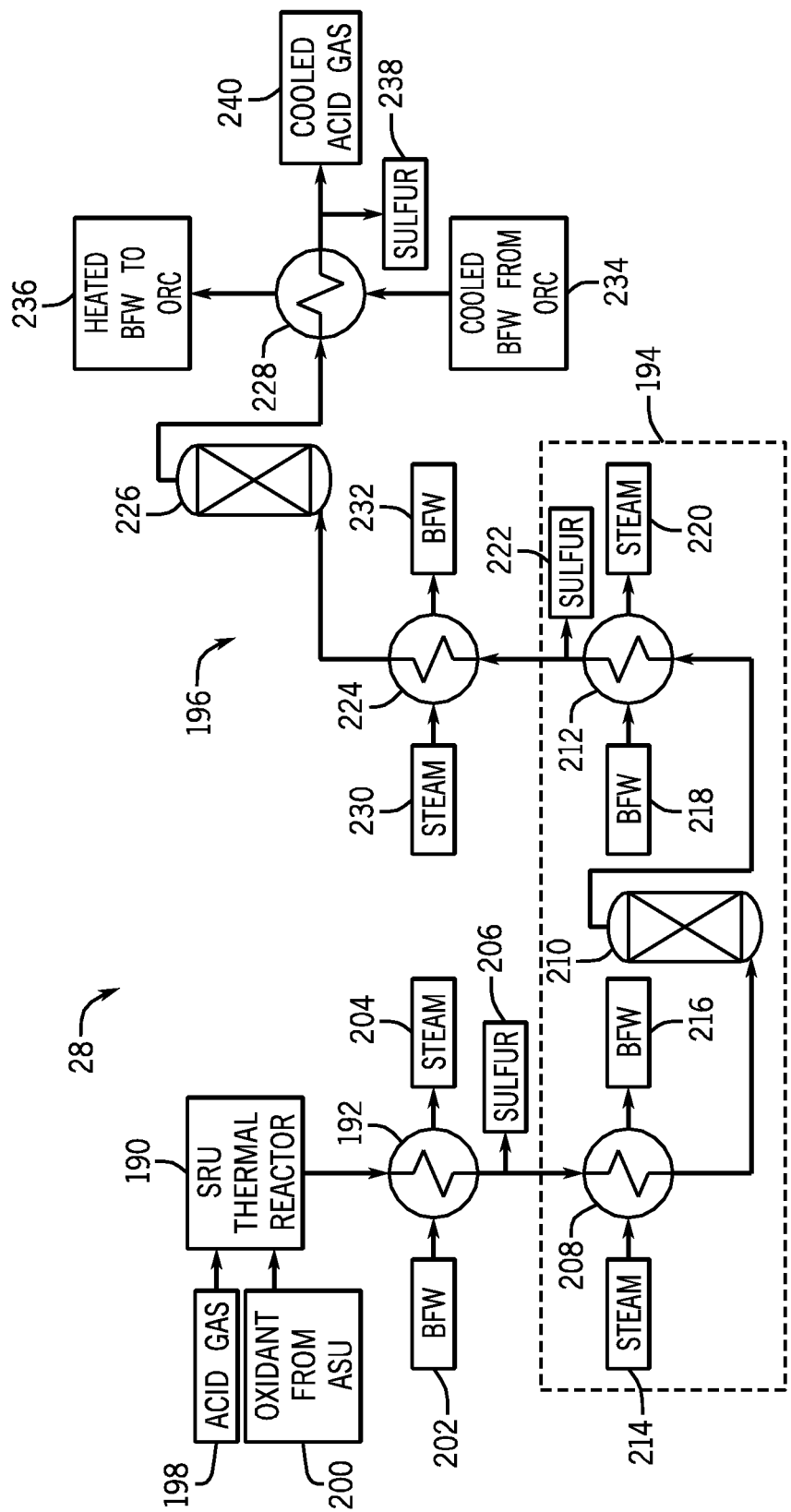
FIG. 4 is a process flow diagram of an embodiment of a sulfur recovery unit of FIG. 1, which may be used with an organic Rankine cycle system.
Figure 5:
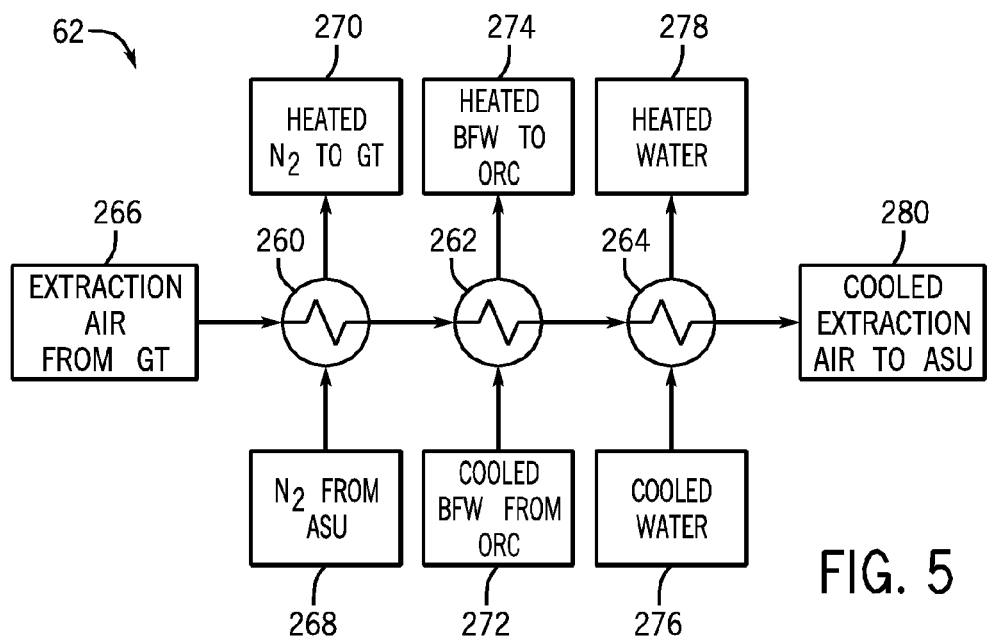
FIG. 5 is a process flow diagram of an embodiment of an extraction air (EA) cooling system of FIG. 1, which may be used with an organic Rankine cycle system.

FIGS. 3, 4, and 5 illustrate three exemplary components of the IGCC system 10 that may be used to generate heated fluid 94 for use in the ORC 92 of FIG. 2 (such as ORCs 22, 30, and 64 of FIG. 1). For example, FIG. 3 is a process flow diagram of an embodiment of the LTGC unit 20 of FIG. 1, which may be used with an organic Rankine cycle system 90 of FIG. 2 (i.e., the ORC 22 of FIG. 1). As illustrated, in certain embodiments, the LTGC unit 20 may include three heat exchangers 150, 152, and 154. The three heat exchangers 150, 152, and 154 may be any type of heat exchangers capable of transferring heat from syngas (e.g., from the gasifier 16 of FIG. 1) to a coolant, such as water or steam condensate. In particular, the LTGC unit 20 may include a first heat exchanger 150 (e.g., a low, low pressure (LLP) steam generator) configured to receive hot raw syngas 156 from the gasifier 16 of FIG. 1, and to cool the hot raw syngas 156 with boiler feedwater 158. More specifically, heat from the hot raw syngas 156 may be transferred into the boiler feedwater 158 to generate LLP steam 160 (e.g., steam at a pressure range between approximately 1.38 bar and approximately 2.76 bar).

For example, in certain embodiments, the hot raw syngas 156 may enter the first heat exchanger 150 at a temperature of approximately 157° C. and the boiler feedwater 158 may enter the first heat exchanger 150 at a temperature of approximately 35° C. However, in other embodiments, the hot raw syngas 156 may enter the first heat exchanger 150 at a temperature in a range of approximately 120° C. to approximately 205° C. More specifically, in certain embodiments, the hot raw syngas 156 may enter the first heat exchanger 150 at a temperature of approximately 144° C., 146° C., 149° C., 152° C., 154° C., 157° C., 160° C., 163° C., 166° C., 168° C., 172° C., and so forth. In addition, the boiler feedwater 158 may enter the first heat exchanger 150 at a temperature in a range of approximately 21° C. to approximately 144° C. More specifically, in certain embodiments, the boiler feedwater 158 may enter the first heat exchanger 150 at a temperature of approximately 27° C., 29° C., 32° C., 35° C., 38° C., 41° C., 44° C., and so forth.

In certain embodiments, the generated LLP steam 160 may exit the first heat exchanger 150 at a temperature of approximately 121° C., and the raw syngas 156 may exit the first heat exchanger 150 at a temperature of approximately 124° C. However, in other embodiments, the generated LLP steam 160 may exit the first heat exchanger 150 at a temperature in a range of approximately 94° C. to approximately 149° C. More specifically, in certain embodiments, the generated LLP steam 160 may exit the first heat exchanger 150 at a temperature of approximately 107° C., 110° C., 113° C., 116° C., 118° C., 121° C., 124° C., 127° C., 129° C., 132° C., 135° C., and so forth. In addition, the raw syngas 156 may exit the first heat exchanger 150 at a temperature in a range of approximately 94° C. to approximately 149° C. More specifically, in certain embodiments, the raw syngas 156 may exit the first heat exchanger 150 at a temperature of approximately 110° C., 113° C., 116° C., 118° C., 121° C., 124° C., 127° C., 130° C., 132° C., 135° C., 138° C., and so forth. In addition, in certain embodiments, the generated LLP steam 160 may exit the first heat exchanger 150 at approximately 2.07 bar or, in other embodiments, may exit the first heat exchanger 150 within a range of approximately 1.38 bar to approximately 2.76 bar. The generated LLP steam 160 may be used in various applications throughout the IGCC system 10.

As illustrated in FIG. 3, the LTGC unit 20 may also include a second heat exchanger 152 configured to receive raw syngas 156 from the first heat exchanger 150, and to cool the raw syngas 156 with steam condensate 162. More specifically, heat from the raw syngas 156 may be transferred into the steam condensate 162 to generate heated steam condensate 164. For example, in certain embodiments, the raw syngas 156 may enter the second heat exchanger 152 at a temperature of approximately 124° C., and the steam condensate 162 may enter the second heat exchanger 152 at a temperature of approximately 38° C. However, in other embodiments, the raw syngas 156 may enter the second heat exchanger 152 at a temperature in a range of approximately 94° C. to approximately 149° C. More specifically, in certain embodiments, the raw syngas 156 may enter the second heat exchanger 152 at a temperature of approximately 110° C., 113° C., 116° C., 118° C., 121° C., 124° C., 127° C., 129° C., 132° C., 135° C., 138° C., and so forth. In addition, the steam condensate 162 may enter the second heat exchanger 152 at a temperature in a range of approximately 10° C. to approximately 66° C. More specifically, in certain embodiments, the steam condensate 162 may enter the second heat exchanger 152 at a temperature of approximately 29° C., 32° C., 35° C., 38° C., 41° C., 43° C., 46° C., and so forth.

In certain embodiments, the heated steam condensate 164 may exit the second heat exchanger 152 at a temperature of approximately 93° C., and the raw syngas 156 may exit the second heat exchanger 152 at a temperature of approximately 89° C. However, in other embodiments, the heated steam condensate 164 may exit the second heat exchanger 152 at a temperature in a range of approximately 75° C. to approximately 121° C. More specifically, in certain embodiments, the heated steam condensate 164 may exit the second heat exchanger 152 at a temperature of approximately 79° C., 82° C., 85° C., 88° C., 91° C., 93° C., 96° C., 99° C., 102° C., 104° C., 107° C., and so forth. In addition, the raw syngas 156 may exit the second heat exchanger 152 at a temperature in a range of approximately 72° C. to approximately 95° C. More specifically, in certain embodiments, the raw syngas 156 may exit the second heat exchanger 152 at a temperature of approximately 75° C., 78° C., 81° C., 84° C., 86° C., 89° C., 92° C., and so forth.

As illustrated in FIG. 3, the LTGC unit 20 may also include a third heat exchanger 154 configured to receive raw syngas 156 from the second heat exchanger 152, and to cool the raw syngas 156 with cooled boiler feedwater 166 from the ORC 22 of FIG. 1. More specifically, heat from the raw syngas 156 may be transferred into the cooled boiler feedwater 166 to generate heated boiler feedwater 168, which may be sent back to the ORC 22 of FIG. 1. The ORC 22 of FIG. 1 functions similarly to the ORC 92 of FIG. 2. More specifically, the heated boiler feedwater 168 from the third heat exchanger 154 of the LTGC unit 20 is equivalent to the heated fluid 94 entering the ORC 92 of FIG. 2, and the cooled boiler feedwater 166 entering the third heat exchanger 154 of the LTGC unit 20 is equivalent to the cooled fluid 96 from the ORC 92 of FIG. 2. The cooled raw syngas 170 from the third heat exchanger 154 may be directed to the gas cleaning unit 24 of FIG. 1.

For example, in certain embodiments, the raw syngas 156 may enter the third heat exchanger 154 at a temperature of approximately 89° C., and may exit the third heat exchanger 154 at a temperature of approximately 60° C. However, in other embodiments, the raw syngas 156 may enter the third heat exchanger 154 at a temperature in a range of approximately 72° C. to approximately 95° C. More specifically, in certain embodiments, the raw syngas 156 may enter the third heat exchanger 154 at a temperature of approximately 75° C., 78° C., 81° C., 84° C., 86° C., 89° C., 92° C., and so forth. In addition, the cooled raw syngas 170 may exit the third heat exchanger 154 at a temperature in a range of approximately 50° C. to approximately 75° C. More specifically, in certain embodiments, the cooled raw syngas 170 may exit the third heat exchanger 154 at a temperature of approximately 55° C., 58° C., 61° C., 64° C., 66° C., 69° C., 72° C., and so forth. In other words, a relatively low amount of heat may be dissipated into the cooled boiler feedwater 166 from the raw syngas 156, since a substantial amount of the heat energy in the hot raw syngas 156 entering the LTGC unit 20 may be transferred into the LLP steam 160 and the heated steam condensate 164 in the first and second heat exchangers 150 and 152, respectively.

In certain embodiments, the cooled boiler feedwater 166 may enter the third heat exchanger 154 at a temperature in a range of approximately 50° C. to approximately 100° C., approximately 65° C. to approximately 85° C., or approximately 70° C. to approximately 75° C. More specifically, in certain embodiments, the cooled boiler feedwater 166 may enter the third heat exchanger 154 at a temperature of approximately 62° C., 65° C., 69° C., 71° C., 74° C., 77° C., 80° C., and so forth. In addition, the heated boiler feedwater 168 may exit the third heat exchanger 154 at a temperature of approximately 80° C. However, in other embodiments, the heated boiler feedwater 168 may exit the third heat exchanger 154 at a temperature in a range of approximately 70° C. to approximately 100° C. More specifically, in certain embodiments, the heated boiler feedwater 168 may exit the third heat exchanger 154 at a temperature of approximately 72° C., 75° C., 78° C., 80° C., 83° C., 86° C., 89° C., 92° C., 95° C., 98° C., and so forth.

As may be appreciated, in certain embodiments, the hot raw syngas 156 may flow through the third heat exchanger 154 before one or more of the first and second heat exchangers 150 and 152. Furthermore, in some embodiments, the hot raw syngas 156 only flows through the third heat exchanger 154.

FIG. 4 is a process flow diagram of an embodiment of the sulfur recovery unit 28 of FIG. 1, which may be used with an organic Rankine cycle system 90 of FIG. 2 (i.e., the ORC 30 of FIG. 1). As illustrated, in certain embodiments, the sulfur recovery unit 28 may include a thermal reactor 190, a thermal condenser 192, an intermediate catalytic stage 194, and a final catalytic stage 196. In the final catalytic stage 196, heat may be exchanged with boiler feedwater to heat the boiler feedwater so that it may be used in an ORC 92, such as the ORC 30 of FIG. 1.

Acid gas 198 from the gas cleaning unit 24 of FIG. 1 and an oxidant 200 from the ASU 32 of FIG. 1 combine in the thermal reactor 190 to enable sulfur extraction. The acid gas 198 then flows into the thermal condenser 192. When the acid gas 198 enters the thermal condenser 192, the acid gas 198 may be at a temperature of approximately 1175° C. In certain embodiments, the acid gas 198 may enter the thermal condenser 192 in a range of approximately 980° C. to approximately 1370° C., approximately 1100° C. to approximately 1250° C., or approximately 1220° C. to approximately 1300° C. More specifically, in certain embodiments, the acid gas 198 may enter the thermal condenser 192 at a temperature of approximately 1010° C., 1065° C., 1090° C., 1105° C., 1130° C., 1175° C., 1250° C., and so forth. Boiler feedwater 202 flows through the thermal condenser 192 to cool the acid gas 198, thereby heating the boiler feedwater 202 to produce steam 204.

The acid gas 198 exits the thermal condenser 192 and sulfur 206 may be separated from the acid gas 198. When the acid gas 198 exits the thermal condenser 192, the acid gas 198 may be at a temperature of approximately 175° C. In certain embodiments, the acid gas 198 may exit the thermal condenser 192 in a temperature range of approximately 150° C. to approximately 200° C., approximately 165° C. to approximately 195° C., or approximately 175° C. to approximately 185° C. More specifically, in certain embodiments, the acid gas 198 may exit the thermal condenser 192 at a temperature of approximately 165° C., 168° C., 171° C., 173° C., 176° C., 179° C., 181° C., and so forth. In certain embodiments, the thermal condenser 192 may have two stages. The first stage may include a waste heat boiler at one end of the condenser 192 to increase the pressure of the steam, and the second stage may include a heat exchanger to produce lower grade steam and condense sulfur.

The acid gas 198 flows from the thermal condenser 192 to the intermediate catalytic stage 194. Although only one intermediate catalytic stage 194 is illustrated, one or more catalytic stages may be included, such as two or three intermediate catalytic stages 194. As illustrated, the intermediate catalytic stage 194 includes a reheater 208, a catalytic reactor 210, and a heat exchanger 212. When the acid gas 198 enters the reheater 208, the acid gas 198 may be at a temperature of approximately 175° C. In certain embodiments, the acid gas 198 may enter the reheater 208 in a temperature range of approximately 150° C. to approximately 200° C., approximately 165° C. to approximately 195° C., or approximately 175° C. to approximately 185° C. More specifically, in certain embodiments, the acid gas 198 may enter the reheater 208 at a temperature of approximately 165° C., 168° C., 171° C., 173° C., 176° C., 179° C., 181° C., and so forth. Steam 214 flows through the reheater 208 to heat the acid gas 198, thereby cooling the steam 214 to produce condensed boiler feedwater 216.

The acid gas 198 exits the reheater 208 and flows into the catalytic reactor 210. When the acid gas 198 exits the reheater 208 and enters the catalytic reactor 210, the acid gas 198 may be at a temperature of approximately 232° C. In certain embodiments, the acid gas 198 may exit the reheater 208 in a temperature range of approximately 200° C. to approximately 250° C., approximately 215° C. to approximately 245° C., or approximately 225° C. to approximately 235° C. More specifically, in certain embodiments, the acid gas 198 may exit the reheater 208 at a temperature of approximately 215° C., 218° C., 221° C., 223° C., 226° C., 229° C., 231° C., and so forth.

The catalytic reactor 210 enables the acid gas 198 to cause a chemical reaction to aid in extracting sulfur from the acid gas 198. The acid gas 198 exits the catalytic reactor 210 and flows into the heat exchanger 212. When the acid gas 198 exits the catalytic reactor 210 and enters the heat exchanger 212, the acid gas 198 may be at a temperature of approximately 270° C. In certain embodiments, the acid gas 198 may exit the catalytic reactor 210 in a temperature range of approximately 250° C. to approximately 300° C., approximately 260° C. to approximately 285° C., or approximately 265° C. to approximately 275° C. More specifically, in certain embodiments, the acid gas 198 may exit the catalytic reactor 210 at a temperature of approximately 265° C., 268° C., 271° C., 273° C., 276° C., 279° C., 281° C., and so forth.

Boiler feedwater 218 flows through the heat exchanger 212 to cool the acid gas 198, thereby heating the boiler feedwater 218 to produce steam 220. The acid gas 198 exits the heat exchanger 212 and sulfur 222 may be separated from the acid gas 198. The acid gas 198 then flows into the final catalytic stage 196. When the acid gas 198 exits the heat exchanger 212 and enters the final catalytic stage 196, the acid gas 198 may be at a temperature of approximately 175° C. In certain embodiments, the acid gas 198 may exit the heat exchanger 212 in a temperature range of approximately 150° C. to approximately 200° C., approximately 165° C. to approximately 195° C., or approximately 175° C. to approximately 185° C. More specifically, in certain embodiments, the acid gas 198 may exit the heat exchanger 212 at a temperature of approximately 165° C., 168° C., 171° C., 173° C., 176° C., 179° C., 181° C., and so forth.

As illustrated, the final catalytic stage 196 includes a final reheater 224, a final catalytic reactor 226, and a final heat exchanger 228. When the acid gas 198 enters the final reheater 224, the acid gas 198 may be at a temperature of approximately 175° C. In certain embodiments, the acid gas 198 may enter the final reheater 224 in a temperature range of approximately 150° C. to approximately 200° C., approximately 165° C. to approximately 195° C., or approximately 175° C. to approximately 185° C. More specifically, in certain embodiments, the acid gas 198 may enter the final reheater 224 at a temperature of approximately 165° C., 168° C., 171° C., 173° C., 176° C., 179° C., 181° C., and so forth. Steam 230 flows through the final reheater 224 to heat the acid gas 198, thereby cooling the steam 230 to produce condensed boiler feedwater 232.

The acid gas 198 exits the final reheater 224 and flows into the final catalytic reactor 226. When the acid gas 198 exits the final reheater 224 and enters the final catalytic reactor 226, the acid gas 198 may be at a temperature of approximately 210° C. In certain embodiments, the acid gas 198 may exit the final reheater 224 in a temperature range of approximately 178° C. to approximately 228° C., approximately 193° C. to approximately 223° C., or approximately 203° C. to approximately 213° C. More specifically, in certain embodiments, the acid gas 198 may exit the final reheater 224 at a temperature of approximately 193° C., 196° C., 199° C., 201° C., 204° C., 207° C., 209° C., and so forth.

The final catalytic reactor 226 enables the acid gas 198 to cause a chemical reaction to aid in extracting sulfur from the acid gas 198. The acid gas 198 exits the final catalytic reactor 226 and flows into the final heat exchanger 228. When the acid gas 198 exits the final catalytic reactor 226 and enters the final heat exchanger 228, the acid gas 198 may be at a temperature of approximately 215° C. In certain embodiments, the acid gas 198 may exit the final catalytic reactor 226 in a temperature range of approximately 183° C. to approximately 233° C., approximately 198° C. to approximately 228° C., or approximately 208° C. to approximately 218° C. More specifically, in certain embodiments, the acid gas 198 may exit the final catalytic reactor 226 at a temperature of approximately 190° C., 193° C., 196° C., 198° C., 201° C., 204° C., 206° C., and so forth.

Cooled boiler feedwater 234, flows from an ORC 92 (i.e., the ORC 30 of FIG. 1) through the final heat exchanger 228 to cool the acid gas 198, thereby heating the cooled boiler feedwater 234 to produce a heated boiler feedwater 236 that is returned to the ORC 92. The final heat exchanger 228 may provide low level heat to the boiler feedwater 234 sufficient to boil a refrigerant in the ORC 92. The acid gas 198 exits the final heat exchanger 228 and sulfur 238 may be separated from the acid gas 198. Cooled acid gas 240 flows from the final heat exchanger 240 back to the gas cleaning unit 24 of FIG. 1. When the cooled acid gas 240 exits the final heat exchanger 228, the cooled acid gas 240 may be at a temperature of approximately 124° C. In certain embodiments, the cooled acid gas 240 may exit the final heat exchanger 228 in a temperature range of approximately 114° C. to approximately 134° C., approximately 124° C. to approximately 130° C., or approximately 126° C. to approximately 128° C. More specifically, in certain embodiments, the cooled acid gas 240 may exit the final heat exchanger 228 at a temperature of approximately 114° C., 117° C., 120° C., 123° C., 126° C., 129° C., 131° C., and so forth.

Furthermore, when the cooled boiler feedwater 234 enters the final heat exchanger 228, the cooled boiler feedwater 234 may be at a temperature of approximately 82° C. In certain embodiments, the cooled boiler feedwater 234 may enter the final heat exchanger 228 in a temperature range of approximately 62° C. to approximately 102° C., approximately 80° C. to approximately 95° C., or approximately 85° C. to approximately 90° C. More specifically, in certain embodiments, the cooled boiler feedwater 234 may enter the final heat exchanger 228 at a temperature of approximately 81° C., 84° C., 87° C., 89° C., 92° C., 95° C., 98° C., and so forth. In addition, when the heated boiler feedwater 236 exits the final heat exchanger 228, the heated boiler feedwater 236 may be at a temperature of approximately 124° C. In certain embodiments, the heated boiler feedwater 236 may exit the final heat exchanger 228 in a temperature range of approximately 110° C. to approximately 135° C., approximately 115° C. to approximately 130° C., or approximately 118° C. to approximately 123° C. More specifically, in certain embodiments, the heated boiler feedwater 236 may exit the final heat exchanger 228 at a temperature of approximately 111° C., 114° C., 117° C., 119° C., 122° C., 125° C., 128° C., and so forth.

The ORC 30 of FIG. 1 functions similarly to the ORC 92 of FIG. 2. More specifically, the heated boiler feedwater 236 from the final heat exchanger 228 of the sulfur recovery unit 28 is equivalent to the heated fluid 94 entering the ORC 92 of FIG. 2, and the cooled boiler feedwater 234 entering the final heat exchanger 228 of the sulfur recovery unit 28 is equivalent to the cooled fluid 96 from the ORC 92 of FIG. 2. As may be appreciated, in certain embodiments, the cooled boiler feedwater 234 may flow through any heat exchanger 192, 212, and 228 to produce the heated boiler feedwater 236.

FIG. 5 is a process flow diagram of an embodiment of the extraction air (EA) cooling system 62 of FIG. 1, which may be used with an organic Rankine cycle system 90 of FIG. 2 (i.e., the ORC 64 of FIG. 1). As illustrated, in certain embodiments, the EA cooling system 62 may include three heat exchangers 260, 262, and 264. The three heat exchangers 260, 262, and 264 may be any type of heat exchangers capable of transferring heat from gas turbine extraction air to a coolant, such as water or steam condensate. In particular, the EA cooling system 62 may include a first heat exchanger 260 (e.g., to heat $N_2$) configured to receive gas turbine extraction air 266 from the combustor 42 of FIG. 1, and to cool the gas turbine extraction air 266 with nitrogen ($N_2$) 268 from the ASU 32 of FIG. 1. More specifically, heat from the gas turbine extraction air 266 may be transferred into the nitrogen 268 to generate heated nitrogen 270.

For example, in certain embodiments, the gas turbine extraction air 266 may enter the first heat exchanger 260 at a temperature of approximately 400° C., and the nitrogen 268 may enter the first heat exchanger 260 at a temperature of approximately 30° C. to approximately 120° C. However, in other embodiments, the gas turbine extraction air 266 may enter the first heat exchanger 260 at a temperature in a range of approximately 370° C. to approximately 425° C. More specifically, in certain embodiments, the gas turbine extraction air 266 may enter the first heat exchanger 260 at a temperature of approximately 378° C., 381° C., 384° C., 386° C., 389° C., 392° C., 395° C., 398° C., 400° C., 403° C., 406° C., and so forth. In addition, the nitrogen 268 may enter the first heat exchanger 260 at a temperature in a range of approximately 20° C. to approximately 120° C. More specifically, in certain embodiments, the nitrogen 268 may enter the first heat exchanger 260 at a temperature of approximately 30° C., 45° C., 60° C., 75° C., 90° C., 105° C., 120° C., and so forth.

In certain embodiments, the heated nitrogen 270 may exit the first heat exchanger 260 at a temperature of approximately 100° C., and the gas turbine extraction air 266 may exit the first heat exchanger 260 at a temperature of approximately 165° C. However, in other embodiments, the heated nitrogen 270 may exit the first heat exchanger 260 at a temperature in a range of approximately 80° C. to approximately 120° C. More specifically, in certain embodiments, the heated nitrogen 270 may exit the first heat exchanger 260 at a temperature of approximately 87° C., 90° C., 93° C., 96° C., 98° C., 101° C., 104° C., 107° C., 109° C., 112° C., 115° C., and so forth. In addition, the gas turbine extraction air 266 may exit the first heat exchanger 260 at a temperature in a range of approximately 150° C. to approximately 175° C. More specifically, in certain embodiments, the gas turbine extraction air 266 may exit the first heat exchanger 260 at a temperature of approximately 150° C., 153° C., 156° C., 158° C., 161° C., 164° C., 167° C., 170° C., 172° C., 175° C., and so forth.

As illustrated in FIG. 5, the EA cooling system 62 may also include a second heat exchanger 262 configured to receive gas turbine extraction air 266 from the first heat exchanger 260 and to cool the gas turbine extraction air 266 with cooled boiler feedwater 272. More specifically, heat from the gas turbine extraction air 266 may be transferred into the cooled boiler feedwater 272 to generate heated boiler feedwater 274, which may be sent back to the ORC 64 of FIG. 1. For example, in certain embodiments, the gas turbine extraction air 266 may enter the second heat exchanger 262 at a temperature of approximately 165° C., and the cooled boiler feedwater 272 may enter the second heat exchanger 262 at a temperature of approximately 87° C. However, in other embodiments, the gas turbine extraction air 266 may enter the second heat exchanger 262 at a temperature in a range of approximately 150° C. to approximately 175° C. More specifically, in certain embodiments, the gas turbine extraction air 266 may enter the second heat exchanger 262 at a temperature of approximately 150° C., 153° C., 156° C., 158° C., 161° C., 164° C., 167° C., 170° C., 172° C., 175° C., and so forth. In addition, the cooled boiler feedwater 272 may enter the second heat exchanger 262 at a temperature in a range of approximately 66° C. to approximately 95° C. More specifically, in certain embodiments, the cooled boiler feedwater 272 may enter the second heat exchanger 262 at a temperature of approximately 75° C., 78° C., 81° C., 84° C., 86° C., 89° C., 92° C., and so forth.

In certain embodiments, the heated boiler feedwater 274 may exit the second heat exchanger 262 at a temperature of approximately 135° C., and the gas turbine extraction air 266 may exit the second heat exchanger 262 at a temperature of approximately 94° C. However, in other embodiments, the heated boiler feedwater 274 may exit the second heat exchanger 262 at a temperature in a range of approximately 122° C. to approximately 150° C. More specifically, in certain embodiments, the heated boiler feedwater 274 may exit the second heat exchanger 262 at a temperature of approximately 129° C., 132° C., 135° C., 138° C., 141° C., 143° C., 146° C., 149° C., 152° C., 154° C., 157° C., and so forth. In addition, the gas turbine extraction air 266 may exit the second heat exchanger 262 at a temperature in a range of approximately 80° C. to approximately 110° C. More specifically, in certain embodiments, the gas turbine extraction air 266 may exit the second heat exchanger 262 at a temperature of approximately 85° C., 88° C., 91° C., 94° C., 96° C., 99° C., 102° C., and so forth.

The ORC 64 of FIG. 1 functions similarly to the ORC 92 of FIG. 2. More specifically, the heated boiler feedwater 274 from the second heat exchanger 262 of the EA cooling system 62 is equivalent to the heated fluid 94 entering the ORC 92 of FIG. 2, and the cooled boiler feedwater 272 entering the second heat exchanger 262 of the EA cooling system 62 is equivalent to the cooled fluid 96 from the ORC 92 of FIG. 2.

As illustrated in FIG. 5, the EA cooling system 62 may also include a third heat exchanger 264 configured to receive gas turbine extraction air 266 from the second heat exchanger 262, and to cool the gas turbine extraction air 266 with cooled water 276, such as from the cooling tower 76 of FIG. 1. More specifically, heat from the gas turbine extraction air 266 may be transferred into the cooled water 276 to generate heated water 278. Cooled gas turbine extraction air 280 from the third heat exchanger 264 may be directed to the ASU 32 of FIG. 1.

For example, in certain embodiments, the gas turbine extraction air 266 may enter the third heat exchanger 264 at a temperature of approximately 94° C., and may exit the third heat exchanger 264 at a temperature of approximately 32° C. However, in other embodiments, the gas turbine extraction air 266 may enter the third heat exchanger 264 at a temperature in a range of approximately 80° C. to approximately 110° C. More specifically, in certain embodiments, the gas turbine extraction air 266 may enter the third heat exchanger 264 at a temperature of approximately 85° C., 88° C., 91° C., 94° C., 96° C., 99° C., 102° C., and so forth. In addition, the cooled gas turbine extraction air 280 may exit the third heat exchanger 264 at a temperature in a range of approximately 15° C. to approximately 50° C. More specifically, in certain embodiments, the cooled gas turbine extraction air 280 may exit the third heat exchanger 264 at a temperature of approximately 25° C., 28° C., 31° C., 34° C., 36° C., 39° C., 42° C., and so forth.

In certain embodiments, the cooled water 276 may enter the third heat exchanger 264 at a temperature in a range of approximately 10° C. to approximately 60° C., approximately 15° C. to approximately 45° C., or approximately 30° C. to approximately 55° C. More specifically, in certain embodiments, the cooled water 276 may enter the third heat exchanger 264 at a temperature of approximately 22° C., 25° C., 29° C., 31° C., 34° C., 37° C., 40° C., and so forth. In addition, the heated water 278 may exit the third heat exchanger 264 at a temperature of approximately 70° C. However, in other embodiments, the heated water 278 may exit the third heat exchanger 264 at a temperature in a range of approximately 60° C. to approximately 90° C. More specifically, in certain embodiments, the heated water 278 may exit the third heat exchanger 264 at a temperature of approximately 62° C., 65° C., 68° C., 70° C., 73° C., 76° C., 79° C., 82° C., 85° C., 88° C., and so forth.

As may be appreciated, in certain embodiments, the extraction air 266 may flow through the second heat exchanger 262 before the first heat exchanger 260 or after the third heat exchanger 264. Furthermore, in some embodiments, the extraction air 266 only flows through the second heat exchanger 262.

Figure 6:
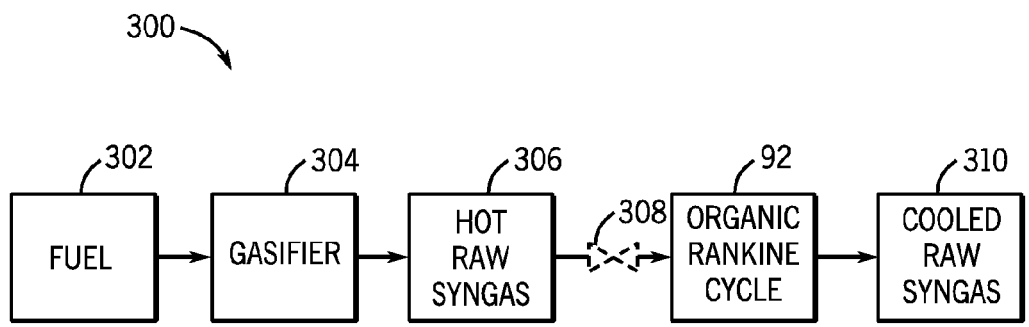
FIG. 6 is a process flow diagram of an embodiment of a gasification system in which an organic Rankine cycle system utilizes heat generated by the system.

FIG. 6 is a process flow diagram of an embodiment of a gasification system 300 in which an organic Rankine cycle system utilizes heat generated by the system. A fuel 302, such as coal, petroleum coke, biomass, wood-based materials, agricultural wastes, tars, coke oven gas, asphalt, heavy residues from a refinery, or other carbon containing items, is provided to a gasifier 304. The gasifier 304 operates much like the gasifier 16 described above in relation to FIG. 1. As such, the gasifier 304 may convert the fuel 302 into a hot raw syngas 306. The hot raw syngas 306 may include approximately 85 percent of carbon monoxide and hydrogen, as well as $CO_2$, $CH_4$, HCl, COS, $NH_3$, HCN, and $H_2S$ (based on the sulfur content of the fuel 302). The hot raw syngas 306 from the gasifier 304 may then be directed to the organic Rankine cycle system 90 described in FIG. 2. In certain embodiments, an expansion device 308 is used to decrease the pressure of the hot raw syngas 306 prior to the hot raw syngas 306 being used in the organic Rankine cycle system 90. The organic Rankine cycle system 90 extracts heat from the hot raw syngas 306 to produce energy. After heat is extracted from the hot raw syngas 306, a cooled raw syngas 310 results. The cooled raw syngas 310 may be used by the gasification system 300, or the cooled raw syngas 310 may be delivered to another system to be used. In certain embodiments, the cooled raw syngas 310 is a clean syngas produced from a clean burning fuel 302, therefore the cooled raw syngas 310 does not require cleaning. In other embodiments, the cooled raw syngas 310 is cleaned to remove impurities. As may be appreciated, by using the hot raw syngas 306 directly with the organic Rankine cycle system 90, the hot raw syngas 306 may efficiently transfer heat energy to be used to produce power.

Returning now to FIG. 2, the type of refrigerant used in an organic Rankine cycle system 90 as discussed in this application may be the type of refrigerant used in an acid gas removal unit. Furthermore, the organic Rankine cycle systems 90 (e.g., the ORCs 22, 30, and 64 of FIG. 1) discussed in this application may be installed in new gasification systems or the organic Rankine cycle systems 90 may be retrofitted into existing gasification systems. Likewise, while organic Rankine cycle systems 90 are described as being used in specific portions of a gasification system, organic Rankine cycle systems 90 may be used in other portions of a gasification system where low, or other, levels of heat may be utilized.

Technical effects of the invention include utilization of potentially low levels of heat from various portions of a gasification system. In certain embodiments, the low levels of heat may be approximately 70° C. to approximately 100° C., while in other embodiments, the levels of heat may be approximately 150° C. to approximately 300° C. By using otherwise unused heat from the gasification system, an organic Rankine cycle system 90 may produce power, and thereby reduce the power consumed by the gasification system. Furthermore, less power may be needed for cooling systems in the gasification system. In addition, gases may be cooled without reducing gas pressure. In the organic Rankine cycle system 90, the refrigerants used may subject the components of the organic Rankine cycle system 90 to less exposure to corrosion than refrigerants that may be utilized in other systems. A decrease in exposure to corrosion may reduce the cost of producing parts for the organic Rankine cycle system 90.

As may be appreciated, certain embodiments of a gasification system may include one, two, three, or more organic Rankine cycle systems (22, 30, 64). In other words, heated fluid may be produced using the gasification system and used in one or more organic Rankine cycle systems (22, 30, 64). For example, certain embodiments may utilize heat from the hot raw syngas, the gas cooling system (e.g., low temperature gas cooling system), the sulfur recovery unit, the air extraction cooling system, or any combination thereof to produce a heated fluid. In such embodiments, the heated fluid may be combined from one, two, three or more portions of the gasification system to flow to one organic Rankine cycle system (22, 30, 64), or the heated fluid may flow to multiple organic Rankine cycle systems (22, 30, 64). Likewise, cooled fluid may flow from one or more organic Rankine cycle systems (22, 30, 64) to the gasification system, the gas cooling system, the sulfur recovery unit, the air extraction cooling system, or any combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a plurality of components comprising:
    a gasifier configured to receive fuel and produce syngas;
    a gas cooling system coupled to the gasifier and configured to cool the syngas from the gasifier;
    a gas cleaning system coupled to the gas cooling system and configured to clean the syngas from the gas cooling system; and
    a gas turbine coupled to the gas cleaning system and configured to combust the syngas from the gas cleaning system; and
at least one organic Rankine cycle system coupled to the plurality of components and configured to convert heat from the plurality of components to produce power, wherein the at least one organic Rankine cycle system is configured to receive heated boiler feedwater from the plurality of components and to deliver cooled boiler feedwater to the plurality of components, and the at least one organic Rankine cycle system is configured to produce the power by converting heat energy in the heated boiler feedwater to electrical energy;
wherein the gas cooling system is coupled to the at least one organic Rankine cycle system, and the gas cooling system is configured to receive the cooled boiler feedwater from the at least one organic Rankine cycle system and to deliver the heated boiler feedwater to the at least one organic Rankine cycle system;
wherein the gas cooling system comprises a first heat exchanger configured to heat boiler feedwater with syngas from the gasifier to generate low, low pressure steam, a second heat exchanger configured to heat steam condensate with syngas from the first heat exchanger to generate heated steam condensate, and a third heat exchanger configured to heat the cooled boiler feedwater from the at least one organic Rankine cycle system with syngas from the second heat exchanger to generate the heated boiler feedwater.

2. The system of claim 1, comprising a sulfur recovery unit coupled to the gas cleaning system and to the at least one organic Rankine cycle system, wherein the sulfur recovery unit is configured to receive the cooled boiler feedwater from the at least one organic Rankine cycle system and to deliver the heated boiler feedwater to the at least one organic Rankine cycle system.

3. The system of claim 2, wherein the sulfur recovery unit comprises a heat exchanger configured to heat the cooled boiler feedwater from the at least one organic Rankine cycle system with acid gas received from the gas cleaning system to generate the heated boiler feedwater.

4. The system of claim 1, comprising an extraction air cooling system coupled to the gas turbine and to the at least one organic Rankine cycle system, wherein the extraction air cooling system is configured to receive the cooled boiler feedwater from the at least one organic Rankine cycle system and to deliver the heated boiler feedwater to the at least one organic Rankine cycle system.

5. The system of claim 4, wherein the extraction air cooling system comprises a first heat exchanger configured to heat nitrogen with extraction air from the gas turbine to generate heated nitrogen, a second heat exchanger configured to heat the cooled boiler feedwater from the at least one organic Rankine cycle system with extraction air from the first heat exchanger to generate the heated boiler feedwater, and a third heat exchanger configured to heat cooled water with extraction air from the second heat exchanger to generate heated water.

6. The system of claim 1, wherein the at least one organic Rankine cycle system is configured to use water to heat a refrigerant.

7. The system of claim 1, wherein the at least one organic Rankine cycle system is configured to use isobutane as a refrigerant.

8. A system, comprising:
an integrated gasification combined cycle (IGCC) system; and
at least one organic Rankine cycle system coupled to the IGCC system and configured to receive heated boiler feedwater from the IGCC system, to deliver cooled boiler feedwater to the IGCC system, and to produce power by converting heat energy in the heated boiler feedwater to electrical energy, wherein the at least one organic Rankine cycle system is coupled to a gas cooling system of the IGCC system, system is configured to receive the cooled boiler feedwater from the at least one organic Rankine cycle system and to deliver the heated boiler feedwater to the at least one organic Rankine cycle system;
wherein the gas cooling system comprises a first heat exchanger configured to heat boiler feedwater with syngas from a gasifier of the IGCC system to generate low, low pressure steam, a second heat exchanger configured to heat steam condensate with syngas from the first heat exchanger to generate heated steam condensate, and a third heat exchanger configured to heat the cooled boiler feedwater from the at least one organic Rankine cycle system with syngas from the second heat exchanger to generate the heated boiler feedwater.

9. The system of claim 8, wherein the at least one organic Rankine cycle system is coupled to a sulfur recovery unit of the IGCC system, wherein the sulfur recovery unit is configured to receive the cooled boiler feedwater from the at least one organic Rankine cycle system and to deliver the heated boiler feedwater to the at least one organic Rankine cycle system.

10. The system of claim 9, wherein the sulfur recovery unit comprises a heat exchanger configured to heat the cooled boiler feedwater from the at least one organic Rankine cycle system with acid gas received from a gas cleaning system of the IGCC system to generate the heated boiler feedwater.

11. The system of claim 8, wherein the at least one organic Rankine cycle system is coupled to an extraction air cooling system of the IGCC system, wherein the extraction air cooling system is configured to receive the cooled boiler feedwater from the at least one organic Rankine cycle system and to deliver the heated boiler feedwater to the at least one organic Rankine cycle system.

12. The system of claim 11, wherein the extraction air cooling system comprises a first heat exchanger configured to heat nitrogen with extraction air from a gas turbine of the IGCC system to generate heated nitrogen, a second heat exchanger configured to heat the cooled boiler feedwater from the at least one organic Rankine cycle system with extraction air from the first heat exchanger to generate the heated boiler feedwater, and a third heat exchanger configured to heat cooled water with extraction air from the second heat exchanger to generate heated water.

13. A system, comprising:
a plurality of components comprising:
a gasifier configured to receive fuel and produce syngas;
a gas cooling system coupled to the gasifier and configured to cool the syngas from the gasifier;
a gas cleaning system coupled to the gas cooling system and configured to clean the syngas from the gas cooling system; and
a gas turbine coupled to the gas cleaning system and configured to combust the syngas from the gas cleaning system;
at least one organic Rankine cycle system coupled to the plurality of components and configured to convert heat from the plurality of components to produce power, wherein the at least one organic Rankine cycle system is configured to receive heated boiler feedwater from the plurality of components and to deliver cooled boiler feedwater to the plurality of components, and the at least one organic Rankine cycle system is configured to produce the power by converting heat energy in the heated boiler feedwater to electrical energy; and
an extraction air cooling system coupled to the gas turbine and to the at least one organic Rankine cycle system, wherein the extraction air cooling system is configured to receive the cooled boiler feedwater from the at least one organic Rankine cycle system and to deliver the heated boiler feedwater to the at least one organic Rankine cycle system.

14. The system of claim 13, wherein the gas cooling system is coupled to the at least one organic Rankine cycle system, and the gas cooling system is configured to receive the cooled boiler feedwater from the at least one organic Rankine cycle system and to deliver the heated boiler feedwater to the at least one organic Rankine cycle system.

15. The system of claim 14, wherein the gas cooling system comprises a first heat exchanger configured to heat boiler feedwater with syngas from the gasifier to generate low, low pressure steam, a second heat exchanger configured to heat steam condensate with syngas from the first heat exchanger to generate heated steam condensate, and a third heat exchanger configured to heat the cooled boiler feedwater from the at least one organic Rankine cycle system with syngas from the second heat exchanger to generate the heated boiler feedwater.

16. The system of claim 13, comprising a sulfur recovery unit coupled to the gas cleaning system and to the at least one organic Rankine cycle system, wherein the sulfur recovery unit is configured to receive the cooled boiler feedwater from the at least one organic Rankine cycle system and to deliver the heated boiler feedwater to the at least one organic Rankine cycle system.

17. The system of claim 16, wherein the sulfur recovery unit comprises a heat exchanger configured to heat the cooled boiler feedwater from the at least one organic Rankine cycle system with acid gas received from the gas cleaning system to generate the heated boiler feedwater.

18. The system of claim 17, wherein the extraction air cooling system comprises a first heat exchanger configured to heat nitrogen with extraction air from the gas turbine to generate heated nitrogen, a second heat exchanger configured to heat the cooled boiler feedwater from the at least one organic Rankine cycle system with extraction air from the first heat exchanger to generate the heated boiler feedwater, and a third heat exchanger configured to heat cooled water with extraction air from the second heat exchanger to generate heated water.

19. The system of claim 13, wherein the at least one organic Rankine cycle system is configured to use water to heat a refrigerant.

20. The system of claim 13, wherein the at least one organic Rankine cycle system is configured to use isobutane as a refrigerant.

21. A system, comprising:
   an integrated gasification combined cycle (IGCC) system; and
   at least one organic Rankine cycle system coupled to the IGCC system and configured to receive heated boiler feedwater from the IGCC system, to deliver cooled boiler feedwater to the IGCC system, and to produce power by converting heat energy in the heated boiler feedwater to electrical energy, wherein the at least one organic Rankine cycle system is coupled to an extraction air cooling system of the IGCC system, wherein the extraction air cooling system is configured to receive the cooled boiler feedwater from the at least one organic Rankine cycle system and to deliver the heated boiler feedwater to the at least one organic Rankine cycle system.

22. The system of claim 21, wherein the at least one organic Rankine cycle system is coupled to a gas cooling system of the IGCC system, wherein the gas cooling system is configured to receive the cooled boiler feedwater from the at least one organic Rankine cycle system and to deliver the heated boiler feedwater to the at least one organic Rankine cycle system.

23. The system of claim 22, wherein the gas cooling system comprises a first heat exchanger configured to heat boiler feedwater with syngas from a gasifier of the IGCC system to generate low, low pressure steam, a second heat exchanger configured to heat steam condensate with syngas from the first heat exchanger to generate heated steam condensate, and a third heat exchanger configured to heat the cooled boiler feedwater from the at least one organic Rankine cycle system with syngas from the second heat exchanger to generate the heated boiler feedwater.

24. The system of claim 21, wherein the at least one organic Rankine cycle system is coupled to a sulfur recovery unit of the IGCC system, wherein the sulfur recovery unit is configured to receive the cooled boiler feedwater from the at least one organic Rankine cycle system and to deliver the heated boiler feedwater to the at least one organic Rankine cycle system.

25. The system of claim 24, wherein the sulfur recovery unit comprises a heat exchanger configured to heat the cooled boiler feedwater from the at least one organic Rankine cycle system with acid gas received from a gas cleaning system of the IGCC system to generate the heated boiler feedwater.

26. The system of claim 21, wherein the extraction air cooling system comprises a first heat exchanger configured to heat nitrogen with extraction air from a gas turbine of the IGCC system to generate heated nitrogen, a second heat exchanger configured to heat the cooled boiler feedwater from the at least one organic Rankine cycle system with extraction air from the first heat exchanger to generate the heated boiler feedwater, and a third heat exchanger configured to heat cooled water with extraction air from the second heat exchanger to generate heated water.

* * * * *